July 31, 1934.  G. G. H. RYDBERG  1,968,539
MEASURING APPARATUS
Filed Jan. 29, 1931  2 Sheets-Sheet 1

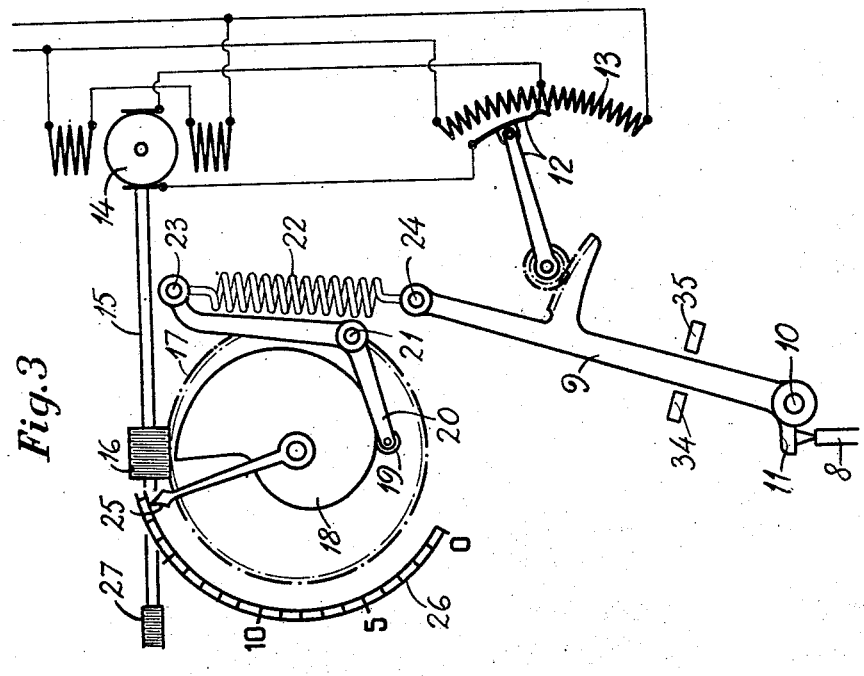
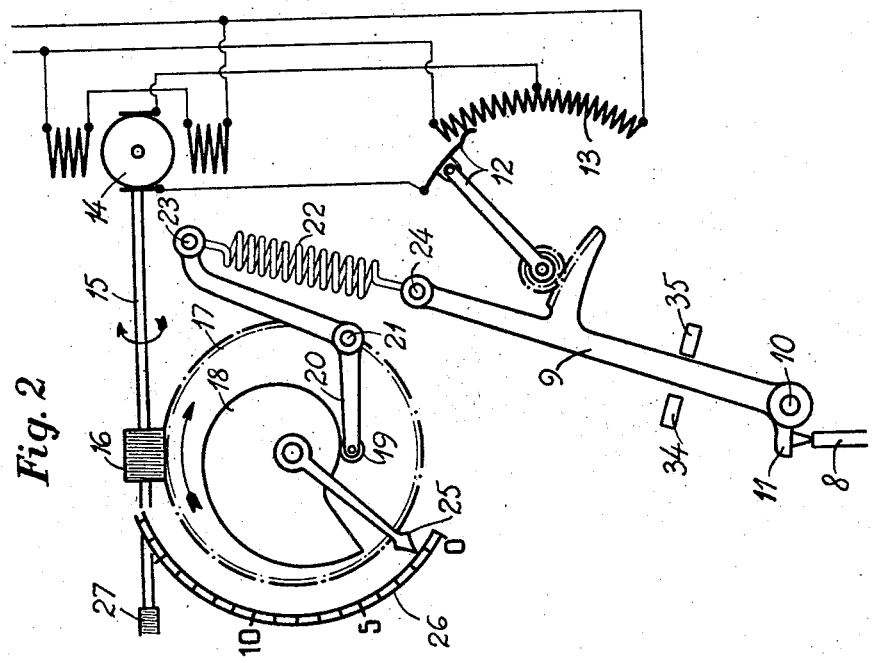

Patented July 31, 1934

UNITED STATES PATENT OFFICE 1,968,539

MEASURING APPARATUS

Gustav Georg Herman Rydberg, Alsten, Sweden, assignor to Svenska Ackumulator Aktiebolaget Jungner, Stockholm, Sweden

Application January 29, 1931, Serial No. 512,232

3 Claims. (Cl. 73—167)

My invention relates to an arrangement for measuring, in any desired function, an outside variable factor, which actuates the receiving member of said arrangement in an exponential function of said variable factor.

The object of the invention is to accomplish this by mechanical means, consisting of a receiving member, a starter, a power producing member, an equilibrating arrangement and a measuring arrangement.

This is obtained, with said mechanical means, by the following arrangement. The receiving member is actuated by the outside variable factor in the form of a force which has the same ratio of variation as said factor in an exponential quantity. The starter is actuated by the receiving member and introduces outside power in required directions to the power producing member which operates the equilibrating arrangement. This latter, in its turn, exerts a force on the starter, so directed that the starter is forced into a position at which all forces, exerted on the starter, are balanced. The starter is controlled in its positions by the force exerted by the equilibrating arrangement in such a way that the starter directs the outside force to the power producing member so that the latter moves in a ratio, directly proportionate to the desired function of the outside variable factor. It is therefore only necessary to connect up any of the parts that are moving in the same ratio as the power producing member with any suitable measuring device arranged for registering desired function of outside factor.

The equilibrating arrangement may be arranged as follows. A wormgear driven by the power producing member, turns a cam rigidly connected to the wormwheel of said gear and which cam controls the position of a lever pivoting around its fixed fulcrum. To the lever is attached a link, the other end of which is connected to the starter. Elastic means are provided in the arrangement between the cam and the starter. Said means may be in the form of a spring as the above mentioned link.

One of the objects of the equilibrating arrangement is to create a momentum on the starter to force it into a balanced position i. e. equilibrium.

A further object of the equilibrium arrangement is to control the movements of the starter in such a way that the power producing member will move in desired relation to the variable outside factor as previously stated.

It is obvious that the shape of the cam, i. e. the curve, the lever, both in regard to the position of its fulcrum and its leverage, the shape and form of the link and the elastic means viz. the spring and the direction and size of the force, exerted by the same on the starter, may be varied relatively to each other, until the desired effect of the equilibrating arrangement is obtained.

The equilibrating arrangement can be designed in various other ways, depending upon, first of all, the type of movement of the power producing member, angular or linear, further on the type of movement of the cam, angular or linear, and also on the shape, form, manner of operation of the other parts of the equilibrating arrangement etc.

Of the drawings: Fig. 1 is a diagrammatic representation of an apparatus arranged for measuring the speed of and the distance covered by a ship, operating in the manner described above. It shows the position of the various members of the arrangement when no outside factor is exerting any force on the receiving member i. e. when there is no relative movement between the ship and the surrounding water.

Fig. 2 shows the position of the principal members of the arrangement when a force is actuating the receiving member i. e. when the ship is proceeding through the water at an increasing speed.

Fig. 3 shows the position of the same members as in Fig. 2, when the system is in equilibrium, i. e. when the ship is moving at a constant speed through the water.

Figure 1:
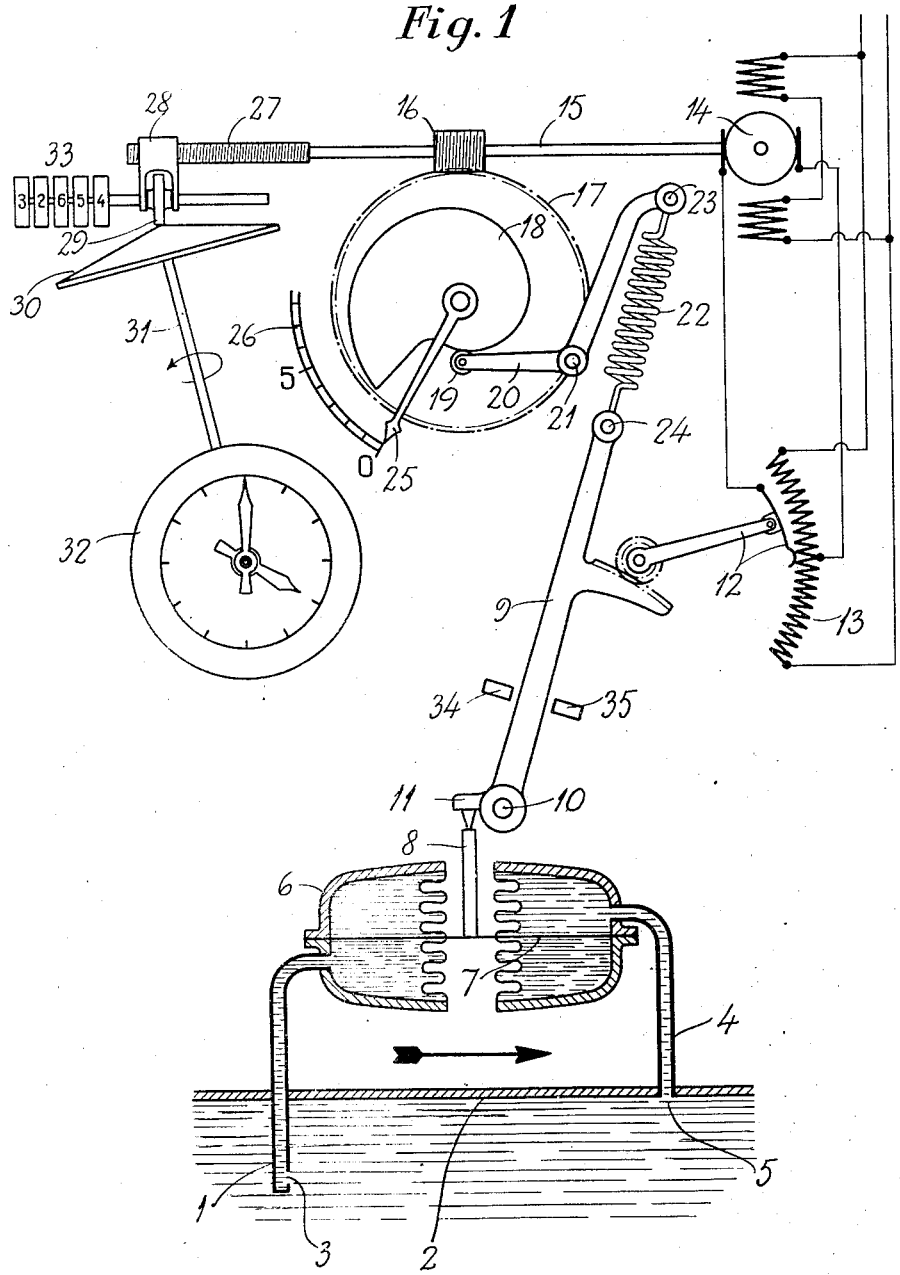

1 is the Pitot tube protruding from the ships bottom 2, with its Pitot aperture 3. 4 is a static tube with its static aperture 5 arranged flush with the ships bottom. 6 is a vessel, divided by a diaphragm 7 in two chambers, each connected to the Pitot and the static tubes, respectively. 8 is a rod connected to the diaphragm 7. The above mentioned parts i. e. 1 to 8, constitute the receiving member of the arrangement. 9 is a lever, pivoting around the fulcrum 10, provided with an arm 11. 12 is an electrical contact. 13 is a starting and regulating resistance. The parts 9 to 13 constitute the starter.

14 is a reversible electric motor and constitutes the power introducing member.

15 is a shaft. 16 is a worm on shaft 15. 17 is a wormwheel. 18 a cam rigidly connected to the wormwheel 17. 19 is a roller. 20 is a lever, turning around the fulcrum 21. 22 is a spring. 23 is the point of attachment of the spring to the lever 20 and 24 is the point of attachment of the said spring to the lever 9. The parts 18 to 22 constitute the equilibrating arrangement, and the parts 15 to 17 the mechanical connecting means between the motor and the equilibrating arrangement.

25 is a pointer of an indicating device and 26 is the scale for same. The parts 25 and 26 constitute one type of the indicating arrangement. 27 is a screw on the shaft 15. 28 is a traveling nut on the screw 27. 29 is friction wheel. 30 is a conical disc. 31 is a shaft connected to the disc 30. 32 is a clockwork and 33 is a counter. The parts 27 to 33 constitute another type of the indicating arrangement.

34 and 35 are stops for the lever 9.

The entire system operates as follows.

When the ship is at rest, an equal static pressure, depending on the draft of the ship is exerted on each side of the diaphragm 7. When the ship starts to move, a certain pressure, the speed pressure, is created in the Pitot aperture 3, and from there conveyed to the lower chamber of the vessel 6, where it is added to the previously mentioned static pressure. This speed pressure is in a ratio equal to the square of the speed. The diaphragm subjected to, on one side the speed pressure plus the static pressure and on the other side the static pressure alone, will therefore be actuated by a force equal to the speed pressure and will move in an upward direction.

This upward movement is transmitted through the rod 8 to the arm 11 of the lever 9, tilting the latter to the right. The contact 12, being provided with a spur gear engaging with a gear rack attached to the lever 9, will leave its original neutral position and take up a position as shown in Fig. 2, whereby the motor 14 is started in such a direction that the shaft 15, connected to the motor, and the worm 16, turn the wormwheel 17 in the direction indicated by the arrow. In as much as the cam 18 is rigidly connected to said wormwheel, the cam will move and, on account of its curve shape, swing the lever 20 around its fulcrum 21. The spring 22 will then change its position and tension, whereby its force on the lever 9 increases. The motor 14 keeps on running, turning the cam and thereby increasing the force of the spring on the lever 9 until it exceeds the force on said lever exerted by the speed pressure, when the lever 9 will move to the left, until the contact 12 has returned to its original neutral position. The motor will then stop running and the whole system will be in equilibrium, as shown in Fig. 3. The elements of the equilibrating arrangement are, in this case, designed so that the angular movement of the cam has the same ratio of variation as the speed and the position of the pointer 25, rigidly connected to the cam, will indicate the prevailing speed on the scale 26. The other indicating arrangement shown in Fig. 1 and indicated by the figures 27 to 33 will register the distance covered by the ship and operates as follows. When the shaft 15 turns, the position of the traveling nut 28 with its friction wheel 29 changes. As the friction wheel is actuated by the conical disc 30, driven at constant speed, through its shaft 31, by the clockwork 32, it is obvious that the number of revolutions of the friction wheel during a certain period of time will be in direct proportion to the distance covered by the ship during said time. The number of revolutions of the friction wheel is indicated in nautical miles on the counter 33.

If the speed of the ship decreases, it is obvious that the diaphragm 7 will, on account of the decreased speed pressure, be moved downwards, whereby the lever 9 will tilt to the left, moving the contact 12 to the lower part of the resistance 13. The reversible motor 14 will then start to run in the opposite direction to what it was running when the speed increased, thereby moving the equilibrating arrangement in such a way that the force on the lever 9, exerted by the spring, decreases until the lever has brought the contact 12 back to its orginal neutral position and equilibrium is again attained. This change in speed is indicated in the same way as mentioned before on the measuring arrangement provided.

Any excessive movement of the lever 9 is prevented by the stops 34 and 35.

In accordance with the provisions of the patent statutes, I have described the principle of operation of my invention, together with the apparatus, which I now consider to represent the best embodiment thereof: but I desire to have it understood that the apparatus shown is only illustrative, and that the invention can be carried out with the details equivalent in their operation to the details described and/or shown.

What I claim as new and desire to secure by Letters Patent of U. S. A. is,—

1. An apparatus of the character disclosed, comprising in combination, a receiving member having a part adapted to transmit a variable force; a starter including a lever in contact with said part so that said part may exert said force on said lever; a reversible motor operatively connected to said starter; a mechanical equilibrating arrangement connected to said motor, said equilibrating arrangement including a properly shaped cam actuated by said motor, a lever operatively connected to said cam, and a spring connecting said last named lever to said first named lever; said cam moving in accordance with changes in said variable force to positions predetermined relatively to said variable force; and an indicating means operatively connected to said cam.

2. An apparatus of the character disclosed, comprising in combination, a receiving member having a part adapted to transmit a variable force; a starter including a lever in contact with said part so that said part may exert said force on said lever; a reversible motor operatively connected to said starter; a mechanical equilibrating arrangement connected to said motor, said equilibrating arrangement including a properly shaped cam positioned in accordance with the movement of said motor, said movement having a predeterminable relationship to said variable force, a lever operatively connected to said cam, and a spring connecting said last named lever to said first named lever; and an indicating means operatively connected to and having a movement proportionate to that of said motor.

3. An apparatus of the character disclosed, comprising in combination, a receiving member having a part adapted to transmit a variable force; a starter including a lever in contact with said part so that said part may exert said force on said lever; a reversible motor operatively connected to said starter; a mechanical equilibrating arrangement connected to said motor, said equilibrating arrangement including a properly shaped cam positioned in accordance with the movement of said motor, said movement having a predeterminable relationship to said variable force, a lever operatively connected to said cam, and a spring connecting said last named lever to said first named lever; and an indicating means operatively connected to said cam.

GUSTAV GEORG HERMAN RYDBERG.